US012637944B2

(12) United States Patent
Zhan et al.

(10) Patent No.: US 12,637,944 B2
(45) Date of Patent: May 26, 2026

(54) MONITORING SYSTEM FOR EXTERNAL ENVIRONMENT OF OIL WELL PLATFORM

(71) Applicant: Ludong University, Yantai City (CN)

(72) Inventors: Chao Zhan, Yantai City (CN); Qing Wang, Yantai City (CN); Jun Zhu, Yantai City (CN); Hongyuan Shi, Yantai City (CN); Jun Yue, Yantai City (CN); Yan Li, Yantai City (CN); Teng Su, Yantai City (CN)

(73) Assignee: LUDONG UNIVERSITY, Yantai City (CN)

( * ) Notice: Subject to any disclaimer, the term of this patent is extended or adjusted under 35 U.S.C. 154(b) by 112 days.

(21) Appl. No.: 18/421,081

(22) Filed: Jan. 24, 2024

(65) Prior Publication Data

US 2025/0207494 A1     Jun. 26, 2025

(30) Foreign Application Priority Data

Dec. 20, 2023     (CN) ......................... 202311768357.X

(51) Int. Cl.
*E21B 47/12* (2012.01)
*E21B 47/07* (2012.01)
*G01W 1/02* (2006.01)
*G08B 21/18* (2006.01)

(52) U.S. Cl.
CPC .............. *E21B 47/12* (2013.01); *E21B 47/07* (2020.05); *G01W 1/02* (2013.01); *G08B 21/182* (2013.01)

(58) Field of Classification Search
CPC .......... E21B 47/12; E21B 47/07; G01W 1/02; G08B 21/182

USPC .......................................................... 340/540
See application file for complete search history.

(56) References Cited

U.S. PATENT DOCUMENTS

| | | | | |
|---|---|---|---|---|
| 4,852,052 A | * | 7/1989 | Frey ...................... | G01V 1/3817 |
| | | | | 702/9 |
| 6,324,904 B1 | * | 12/2001 | Ishikawa ............... | E21B 47/017 |
| | | | | 257/E29.022 |
| 2005/0284659 A1 | * | 12/2005 | Hall ....................... | H04L 67/025 |
| | | | | 175/27 |
| 2010/0250139 A1 | * | 9/2010 | Hobbs .................... | H04N 7/185 |
| | | | | 702/6 |
| 2015/0134257 A1 | * | 5/2015 | Erge ....................... | E21B 49/003 |
| | | | | 702/9 |
| 2015/0376966 A1 | * | 12/2015 | Balasubramanian ........................ | |
| | | | | E21B 29/002 |
| | | | | 166/55.7 |
| 2016/0091894 A1 | * | 3/2016 | Zhang .................... | B64U 10/13 |
| | | | | 701/2 |

(Continued)

*Primary Examiner* — Zhen Y Wu
(74) *Attorney, Agent, or Firm* — WPAT, PC

(57) ABSTRACT

The disclosure provides a monitoring system for external environment of an oil well platform, and relates to the technical field of real-time monitoring of external environment of the oil well platform, and includes a sensor unit, a satellite transmission unit, a data collector, a central server and a control unit, where sensors are used for collecting detection data and sending the detection data to the satellite transmission unit; the satellite transmission unit stores the detection data to a local storage device in real time through edge calculation and transmits the detection data to a base; the base receives the detection data and then sends the detection data to the data collector; and the data collector receives the detection data and transmits the detection data to the central server.

6 Claims, 1 Drawing Sheet

(56)     References Cited

U.S. PATENT DOCUMENTS

| | | | |
|---|---|---|---|
| 2017/0308802 A1* | 10/2017 | Ramsøy | G06N 20/00 |
| 2018/0274354 A1* | 9/2018 | Nesgaard | E21B 47/022 |
| 2019/0204467 A1* | 7/2019 | Curt | E21B 47/13 |
| 2021/0109252 A1* | 4/2021 | Li | G06N 20/00 |
| 2022/0155071 A1* | 5/2022 | Gray, Jr. | H04W 4/90 |
| 2023/0112008 A1* | 4/2023 | Jandhyala | E21B 41/0064 |
| | | | 73/152.57 |
| 2023/0235664 A1* | 7/2023 | Robutel | B81B 7/0058 |
| | | | 73/152.54 |
| 2024/0049619 A1* | 2/2024 | Lopes Agnese | A01B 79/005 |
| 2024/0301772 A1* | 9/2024 | Al-Mashhad | E21B 47/12 |

* cited by examiner

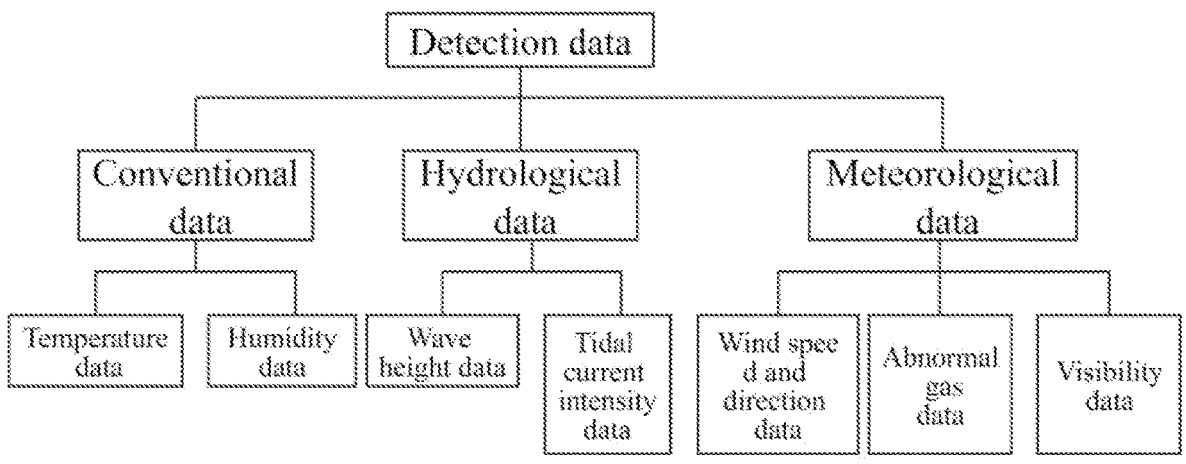

MONITORING SYSTEM FOR EXTERNAL ENVIRONMENT OF OIL WELL PLATFORM

TECHNICAL FIELD

The disclosure relates to a technical field of real-time monitoring of external environment of an oil well platform, and in particular to a monitoring system for the external environment of the oil well platform.

BACKGROUND

Offshore oil drilling platform is an asset-intensive, complex and unstable production facility, and its operation faces many challenges and risks. Marine pollution and other problems not only affect production efficiency and economic benefits, but also endanger environment and workers.

In recent years, the monitoring system of the offshore oil drilling platform has developed rapidly, but the system for monitoring the external environment of offshore oil drilling platform is relatively scarce, so it is difficult to carry out real-time monitoring and give early warning and alarm for the external environment monitoring of the oil well platform.

SUMMARY

A technical problem is solved by the disclosure: the system for monitoring the external environment of the offshore oil drilling platform is relatively scarce in the related technology, so it is difficult to monitor in real time and give an early warning for the external environment monitoring of the oil well platform.

In order to solve the above technical problem, the disclosure provides a following technical scheme: an monitoring system for external environment of an oil well platform, including a sensor unit, a satellite transmission unit, a data collector, a central server and a control unit, where sensors are used for collecting detection data and sending the detection data to the satellite transmission unit; the satellite transmission unit stores the detection data to a local storage device in real time through edge calculation and transmits the detection data to a base; the base receives the detection data and then sends the detection data to the data collector; and the data collector receives the detection data and transmits the detection data to the central server;

the central server is used for cleaning and preprocessing ocean data with different standards and different formats collected from the sensor unit to obtain effective data, and then comparing and analyzing the effective data; and the control unit is used for checking monitoring results and data trends, performing real-time monitoring and performing early warning and alarm based on preset environmental parameters.

According to an optional scheme of the monitoring system for the external environment of the disclosure, the sensor unit includes a temperature sensor, a humidity sensor, a wind direction and speed sensor, a gas sensor, a visibility sensor, a wave height sensor and a fluid sensor.

According to an optional scheme of the monitoring system for the external environment of the disclosure, a control chip is respectively connected with the temperature sensor, the humidity sensor, the wind direction and speed sensor, the gas sensor, the visibility sensor, the wave height sensor and the fluid sensor;

the control chip sends acquisition instructions to the temperature sensor, the humidity sensor, the wind direction and speed sensor, the gas sensor, the visibility sensor, the wave height sensor and the fluid sensor at a preset time interval; and the temperature sensor, the humidity sensor, the wind direction and speed sensor, the gas sensor, the visibility sensor, the wave height sensor and fluid sensor simultaneously acquire data after receiving the acquisition instructions.

According to an optional scheme of the monitoring system for the external environment of the disclosure, the detection data includes conventional data, hydrological data and meteorological data;

the conventional data includes temperature data and humidity data;

the hydrological data include wave height data and tidal current intensity data; and the meteorological data includes wind speed and direction data, abnormal gas data and visibility data.

According to an optional scheme of the monitoring system for the external environment of the disclosure, the local storage device includes a local database and a file system, and is used for classifying and sorting received detection data, storing in the local database, updating on the file system, and then sending to the satellite receiving terminal of the base.

According to an optional scheme of the monitoring system for the external environment of the disclosure, the base receives detection data and then sends the detection data to the data collector, and the data collector stores the received detection data and transmits the received detection data to the central server.

According to an optional scheme of the monitoring system for the external environment of the disclosure, the central server stores received data and preprocesses the ocean data with different standards and different formats collected by the temperature sensor, the humidity sensor, the wind direction and speed sensor, the gas sensor, the visibility sensor, the wave height sensor and the fluid sensor.

According to an optional scheme of the monitoring system for the external environment of the disclosure, preprocessing includes removing erroneous data and standardizing data formats.

According to an optional scheme of the monitoring system for the external environment of the disclosure, the control unit is connected with a terminal application interface, and the terminal application interface is used for viewing the monitoring results and the data trends.

According to an optional scheme of the monitoring system for the external environment of the disclosure, a safety threshold area and a warning threshold of each detection data are defined;

if the detection data exceeds the safety threshold area, a safety warning is issued; and if the detection data exceeds the safety warning area, an alert warning is issued.

The disclosure has following advantages.

Various data is capable of being monitored simultaneously through different sensors of the sensor unit, thus solving the incomplete monitoring for the external environment of the oil well platform; and at the same time, real-time monitoring and early warning is capable of being performed, thus greatly improving the monitoring efficiency and ensuring the safety of equipment and personnel.

BRIEF DESCRIPTION OF THE DRAWING

FIG. 1 is a schematic diagram showing detection data types of an monitoring system for external environment of an oil well platform provided by an embodiment of the present disclosure.

DETAILED DESCRIPTION OF THE EMBODIMENT

In order to make the above objects, features and advantages of the present disclosure more obvious and understandable, a specific embodiment of the present disclosure is described in detail with reference to the attached drawing in the specification. Obviously, the described embodiments are part of the embodiments of the present disclosure, but not all of them.

Embodiment 1

Referring to FIG. 1 and FIG. 2, according to an embodiment of the present disclosure, a monitoring system for external environment of an oil well platform is provided, and is characterized by including a sensor unit, a satellite transmission unit, a data collector, a central server and a control unit, where sensors are used for collecting detection data and sending the detection data to the satellite transmission unit; the satellite transmission unit stores the detection data to a local storage device in real time through edge calculation and transmits the detection data to a base; the base receives the detection data and then sends the detection data to the data collector; and the data collector receives the detection data and transmits the detection data to the central server;

the central server is used for cleaning and preprocessing ocean data with different standards and different formats collected from the sensor unit to obtain effective data, and then comparing and analyzing the effective data; compared with the satellite transmission unit, the central server has greater computing power and storage capacity, and is capable of analyzing massive data.

The control unit is used for checking monitoring results and data trends, performing real-time monitoring and performing early warning and alarm based on preset environmental parameters. By giving an alarm, the operator is capable of taking timely measures to ensure the safety of the oil well platform and effectively preventing accidents.

The sensor unit includes a temperature sensor, a humidity sensor, a wind direction and speed sensor, a gas sensor, a visibility sensor, a wave height sensor and a fluid sensor.

The temperature sensor is used for acquiring temperature data, the humidity sensor is used for acquiring humidity data, the wind direction and wind speed sensor is used for acquiring wind direction and wind speed data of sea surface, the gas sensor is used for detecting abnormal gas data in the air, the visibility sensor is used for detecting visibility, the wave height sensor is used for acquiring wave height data of sea waves, and the fluid sensor is used for acquiring tidal current intensity data.

A control chip is respectively connected with the temperature sensor, the humidity sensor, the wind direction and speed sensor, the gas sensor, the visibility sensor, the wave height sensor and the fluid sensor; and the control chip sends acquisition instructions to the temperature sensor, the humidity sensor, the wind direction and speed sensor, the gas sensor, the visibility sensor, the wave height sensor and the fluid sensor at a preset time interval.

The temperature sensor, the humidity sensor, the wind direction and speed sensor, the gas sensor, the visibility sensor, the wave height sensor and fluid sensor simultaneously acquire data after receiving the acquisition instructions. The control chip optionally adopts an existing single-chip microcomputer control chip, which has pre-written programs and is capable of sending control instructions.

The detection data includes conventional data, hydrological data and meteorological data;

the conventional data includes temperature data and humidity data;

the hydrological data include wave height data and tidal current intensity data; and the meteorological data includes wind speed and direction data, abnormal gas data and visibility data.

The local storage device includes a local database and a file system, and is used for classifying and sorting received detection data, storing in the local database, updating on the file system, and then sending to the satellite receiving terminal of the base. The received detection data are classified according to the temperature data, the humidity data, the wind direction data, the abnormal gas data, the visibility data, the wind speed and direction data, the abnormal gas data and the visibility data, and registered according to the acquisition time.

The base receives detection data and then sends the detection data to the data collector, and the data collector stores the received detection data and transmits the received detection data to the central server.

In an embodiment, the satellite transmission unit includes a satellite server, a transmission satellite and a satellite router, and is capable of realizing the timeliness of data transmission, ensuring the stability of signal transmission, and transmitting the data to a rear data center in time and effectively. Compared with the conventional network transmission, the satellite transmission unit ensures the timeliness, stability and efficiency of data transmission.

The central server stores received data and preprocesses the ocean data with different standards and different formats collected by the temperature sensor, the humidity sensor, the wind direction and speed sensor, the gas sensor, the visibility sensor, the wave height sensor and the fluid sensor.

Preprocessing includes removing erroneous data and standardizing data formats. Preprocessing removes the erroneous data, reduces the amount of data processing, and transform a the data format to facilitate statistics.

The control unit is connected with a terminal application interface, and the terminal application interface is used for viewing the monitoring results and the data trends.

A safety threshold area and a warning threshold of each detection data are defined;

if the detection data exceeds the safety threshold area, a safety warning is issued; and if the detection data exceeds the safety warning area, an alert warning is issued.

Through different sensors of the sensor unit, a variety of monitoring data is capable of being monitored at the same time, including the temperature data, the humidity data, the wind direction and speed data, the abnormal gas data, the visibility data, the wave height data and the tidal current intensity data, thus solving the incomplete monitoring for the external environment of the oil well platform. The edge calculation method is used to process and transmit the data, so as to solve the problem of data redundancy and low efficiency, and at the same time, real-time monitoring and early warning is capable of being performed, thus greatly improving the monitoring efficiency and ensuring the safety of equipment and personnel.

Once an item in the detection data exceeds its corresponding safety range or warning area, the control unit immediately issues a safety warning or warning, and at the same time sends the warning information to the relevant terminal application, so that the operator is capable of taking timely measures to ensure the safety of the well platform and effectively prevent accidents.

It should be noted that the above embodiment is only used to illustrate the technical scheme of the present disclosure, but not to limit it. Although the present disclosure has been described in detail with reference to the optional embodiment, those skilled in the art should understand that the technical scheme of the present disclosure is capable of being modified or replaced by equivalents without departing from the spirit and scope of the technical scheme, which should be included in the scope of the claims of the present disclosure.

What is claimed is:

1. A monitoring system for external environment of an oil well platform, comprising:

a sensor unit, comprising a temperature sensor, a humidity sensor, a wind direction and speed sensor, a gas sensor, a visibility sensor, a wave height sensor and a fluid sensor; wherein the sensor unit is configured to collect detection data with different standards and different formats of the external environment of the oil well platform;

a satellite transmission unit, comprising a satellite server, a transmission satellite and a satellite router; wherein the satellite transmission unit is configured to receive the detection data collected by the sensor unit, store the detection data to a local storage device in real time through edge calculation and-transmit the detection data to a base;

the base, configured to receive the detection data transmitted from the satellite transmission unit, and send the detection data to a data collector;

the data collector, configured to receive the detection data sent from the base, and transmit the detection data to a central server;

the central server, configured to receive the detection data transmitted from the data collector, perform preprocess of removing erroneous data and standardizing data formats on the detection data with different standards and different formats to obtain effective data, and compare and analyze the effective data; and a control unit, configured to check monitoring results and data trends, perform real-time monitoring and perform early warning and alarm based on preset environmental parameters.

2. The monitoring system for the external environment of the oil well platform according to claim 1, wherein a control chip is respectively connected with the temperature sensor, the humidity sensor, the wind direction and speed sensor, the gas sensor, the visibility sensor, the wave height sensor and the fluid sensor;

the control chip sends acquisition instructions to the temperature sensor, the humidity sensor, the wind direction and speed sensor, the gas sensor, the visibility sensor, the wave height sensor and the fluid sensor at a preset time interval; and the temperature sensor, the humidity sensor, the wind direction and speed sensor, the gas sensor, the visibility sensor, the wave height sensor and fluid sensor simultaneously acquire data after receiving the acquisition instructions.

3. The monitoring system for the external environment of the oil well platform according to claim 1, wherein the detection data comprises conventional data, hydrological data and meteorological data;

the conventional data comprises temperature data and humidity data;

the hydrological data comprise wave height data and tidal current intensity data; and the meteorological data comprises wind speed and direction data, and visibility data.

4. The monitoring system for the external environment of the oil well platform according to claim 1, wherein the local storage device comprises a local database and a file system, and is used for classifying and sorting received detection data, storing in the local database, updating on the file system, and then sending to a satellite receiving terminal of the base.

5. The monitoring system for the external environment of the oil well platform according to claim 1, wherein the control unit is connected with a terminal application interface, and the terminal application interface is used for viewing the monitoring results and the data trends.

6. The monitoring system for the external environment of the oil well platform according to claim 5, wherein a safety threshold area and a warning threshold of each detection data are defined;

if the detection data exceeds the safety threshold area, a safety warning is issued; and if the detection data exceeds the safety warning area, an alert warning is issued.

* * * * *